(12) United States Patent
Martin et al.

(10) Patent No.: US 9,157,561 B2
(45) Date of Patent: Oct. 13, 2015

(54) WET CONNECTION SYSTEM, DOWNHOLE SYSTEM USING WET CONNECTION SYSTEM, AND METHOD THEREOF

(71) Applicants: Carl S. Martin, Houston, TX (US); Marc N. Samuelson, Houston, TX (US); Michael Werries, Houston, TX (US)

(72) Inventors: Carl S. Martin, Houston, TX (US); Marc N. Samuelson, Houston, TX (US); Michael Werries, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 340 days.

(21) Appl. No.: 13/909,582

(22) Filed: Jun. 4, 2013

(65) Prior Publication Data

US 2014/0352793 A1    Dec. 4, 2014

(51) Int. Cl.
*E21B 17/02* (2006.01)
*F16L 37/35* (2006.01)
*H01R 13/523* (2006.01)

(52) U.S. Cl.
CPC ............... *F16L 37/35* (2013.01); *E21B 17/028* (2013.01); *H01R 13/523* (2013.01); *Y10T 137/0396* (2015.04)

(58) Field of Classification Search
CPC .................................. E21B 17/02; E21B 41/00
See application file for complete search history.

(56) References Cited

U.S. PATENT DOCUMENTS

| | | |
|---|---|---|
| 4,832,080 A | 5/1989 | Smith, III |
| 5,058,683 A | 10/1991 | Godfrey et al. |
| 5,203,374 A | 4/1993 | Smith, III |
| 5,385,169 A | 1/1995 | Odelius |
| 5,482,082 A | 1/1996 | Turner et al. |
| 5,484,296 A | 1/1996 | Taylor |
| 6,145,539 A | 11/2000 | Wilcox et al. |
| 6,148,858 A | 11/2000 | Kirkman |
| 6,202,690 B1 | 3/2001 | Smith, III |

(Continued)

FOREIGN PATENT DOCUMENTS

WO    2006043883 A1    4/2006

OTHER PUBLICATIONS

International Search Report and the Written Opinion of the International Searching Authority for related PCT Application No. PCT/US2014/035620, mailed Aug. 22, 2014, 12 pages.

(Continued)

*Primary Examiner* — William P Neuder
(74) *Attorney, Agent, or Firm* — Cantor Colburn LLP (57) ABSTRACT

A wet connection system including a first connector configured to connect to a first control line. The first connector including at least one first pathway arranged to fluidly communicate with the first control line, and a biased movable plug movable within the first connector; and, a second connector configured to connect to a second control line. The second connector including a second pathway in fluid communication with the second control line and a biased sleeve movable within the second connector; wherein the first and second connectors are each pressure balanced to prevent internal control line pressure. External borehole pressures from moving the plug and sleeve from their biased positions blocking the respective first and second pathways in the disconnected condition of the wet connection system. Mating of the first connector with the second connector moves the movable plug and the sleeve against their bias to fluidically couple the first and second pathways in a connected condition of the wet connection system. Also included is a method of pressure balancing a hydraulic wet connection system in a downhole environment.

23 Claims, 7 Drawing Sheets

(56) References Cited

U.S. PATENT DOCUMENTS

| | | | |
|---|---|---|---|
| 6,315,461 | B1 | 11/2001 | Cairns |
| 6,719,271 | B2 | 4/2004 | Faramarzi |
| 7,762,525 | B2 | 7/2010 | Smith, III |
| 9,032,997 | B2 * | 5/2015 | Abura et al. ............. 137/614.02 |
| 2010/0206584 | A1 | 8/2010 | Clubb et al. |
| 2010/0300698 | A1 * | 12/2010 | Bedouet et al. ............... 166/355 |
| 2011/0108288 | A1 | 5/2011 | Richards |
| 2011/0306225 | A1 | 12/2011 | Chaize |
| 2013/0312996 | A1 * | 11/2013 | Nicholson ................... 174/50.52 |

OTHER PUBLICATIONS

Parkinson, Stuart, Development of a downhle wet-mateable Power Conenctor for the world's first wireline retrievable ESP system, www.diamould.com, Diamould Ltd; Feb. 28, 2008, pp. 1-30.

Philipe Legrand, Downhole Control line Wet Connectors: Hydraulic, Electric and Fiber Optic Connectors. Are They reliable Completion Options Today?, COIN Soap Box Meeting #5 (SBM#5), Advancing Reservoir Performance, Baker Hughes, 2011 Baker Hughes Incorporated, pp. 1-25.

* cited by examiner

WET CONNECTION SYSTEM, DOWNHOLE SYSTEM USING WET CONNECTION SYSTEM, AND METHOD THEREOF

BACKGROUND

In the drilling and completion industry, the formation of boreholes for the purpose of production or injection of fluid is common. The boreholes are used for exploration or extraction of natural resources such as hydrocarbons, oil, gas, water, and alternatively for CO2 sequestration.

It is sometimes necessary to connect, disconnect, and/or reconnect various components of tools within a borehole in the downhole environment. When control lines are provided in the separate components, they must be reconnected by connectors on each separate component so as to provide a common pathway. Some downhole hydraulic connectors rely on a spring reinforced poppet to resist the encroachment of wellbore fluids into the control line when the components are separated, however this method is limited in pressure differential by the force of the spring holding the poppet in place. Once the hydrostatic pressure overcomes the spring, borehole fluid will leak into the control line. Other downhole hydraulic connectors supply virtually no borehole fluid protection at all and simply allow the fluid access to the control line. This may not be desirable depending on the borehole fluid and the internal make up of the tools to which the control line is attached. As an alternative to allowing borehole fluid encroachment, another method involves running a lower string while mated to an upper tool string with control line all the way to surface in order to maintain a positive pressure balance on the control line.

The art would be receptive to improved apparatus and methods for downhole wet connectors that address the hydraulic control lines attached to such connectors.

BRIEF DESCRIPTION

A wet connection system includes a first connector configured to connect to a first control line, the first connector including at least one first pathway arranged to fluidly communicate with the first control line, and a biased movable plug movable within the first connector; and, a second connector configured to connect to a second control line, the second connector including a second pathway in fluid communication with the second control line and a biased sleeve movable within the second connector; wherein the first and second connectors are each pressure balanced to prevent internal control line pressure and external borehole pressures from moving the plug and sleeve from their biased positions blocking the respective first and second pathways in the disconnected condition of the wet connection system, and mating of the first connector with the second connector moves the movable plug and the sleeve against their bias to fluidically couple the first and second pathways in a connected condition of the wet connection system.

A wet connection system including at least one of a first connector and a second connector, the first connector configured to connect to a first control line, the first connector includes a first connector housing having a first bore, at least one first pathway separate from the first bore, and a fluidic mating area, the at least one first pathway configured to fluidly communicate the fluidic mating area with the first control line, the fluidic mating area interposed between a biasing area of the first bore and a second connector receiving area of the first bore; a biased movable plug movable within the first bore, the movable plug having a first end facing the biasing area of the first bore and a second end facing the second connector receiving area of the first bore, the movable plug biased to block the fluidic mating area to prevent fluidic communication between the first bore and the at least one first pathway in a disconnected condition of the wet connection system, the movable plug movable outside of the fluidic mating area in a connected condition of the wet connection system; and a pressure balancing aperture balancing pressure between the biasing area and the second connector receiving area; and, the second connector configured to connect to a second control line, the second connector including: a probe housing a second pathway in fluid communication with the second control line, the probe including at least one radially directed connector port communicating with the second pathway; a biased movable sleeve configured to at least partially surround the probe and cover the at least one connector port in the disconnected condition and reveal the at least one connector port in the connected condition; first and second radial seals between the sleeve and probe, the first seal disposed on a first side of the at least one connector port and the second seal disposed on a second side of the at least one connector port in the disconnected condition of the wet connection system.

A method of pressure balancing a hydraulic wet connection system in a downhole environment, the method includes providing a first connector with a pressure balancing aperture balancing pressure between opposing sides of a biased movable plug, the plug biased to block, in a disconnected condition, a first pathway in the first connector, the first connector configured to prevent internal control line pressure and external borehole pressures from moving the plug from its biased position in a disconnected condition of the wet connection system; providing a second connector with first and second seals between a probe and a biased movable sleeve, the sleeve biased to block, in a disconnected condition, ports in the probe that connect to a second pathway, the second connector configured to prevent internal control line pressure and external borehole pressures from moving the sleeve from its biased position in a disconnected condition of the wet connection system; selecting one of the first connector and the second connector as a downhole connector, and the other of the first connector and the second connector as an uphole connector; assembling the downhole connector to a first control line; installing the downhole connector to an uphole end of a downhole tool component; employing the downhole tool component in a borehole; assembling the uphole connector to a second control line; installing the uphole connector to a downhole end of an uphole tool component; running the uphole tool component into the borehole; and, connecting the uphole connector to the downhole connector; wherein connecting the uphole connector to the downhole connector moves the movable plug and the sleeve against their bias to fluidically couple the first and second pathways in a connected condition of the wet connection system.

BRIEF DESCRIPTION OF THE DRAWINGS

The following descriptions should not be considered limiting in any way. With reference to the accompanying drawing, like elements are numbered alike.

DETAILED DESCRIPTION

A detailed description of one or more embodiments of the disclosed apparatus and method are presented herein by way of exemplification and not limitation with reference to the Figures.

Exemplary embodiments of a hydrostatically pressure balanced downhole hydraulic wet connection system are described herein. In the exemplary embodiments, the connection system can be run downhole while disconnected without increased downhole hydrostatic pressure shifting any features therein that will subsequently be moved as the connectors within the connection system are mated. This prevents the introduction of wellbore fluids into the hydraulic control lines attached to the connectors despite a differential between the internal control line pressure and the wellbore hydrostatic pressure. As the male and female connectors of the connection system are mated, features are moved creating a continuous hydraulic path to a previously placed control line.

Figure 1:
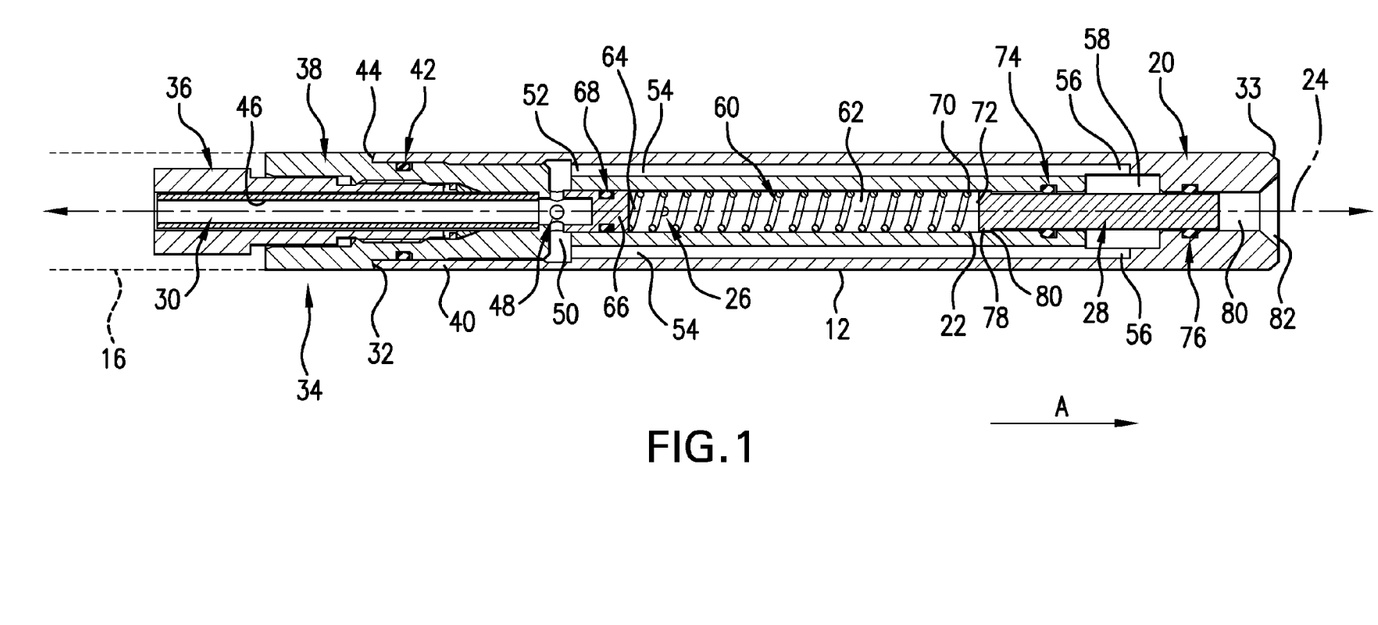
FIG. 1 shows a cross-sectional view of an exemplary embodiment of a female connector for a downhole wet connection system.
Figure 2:
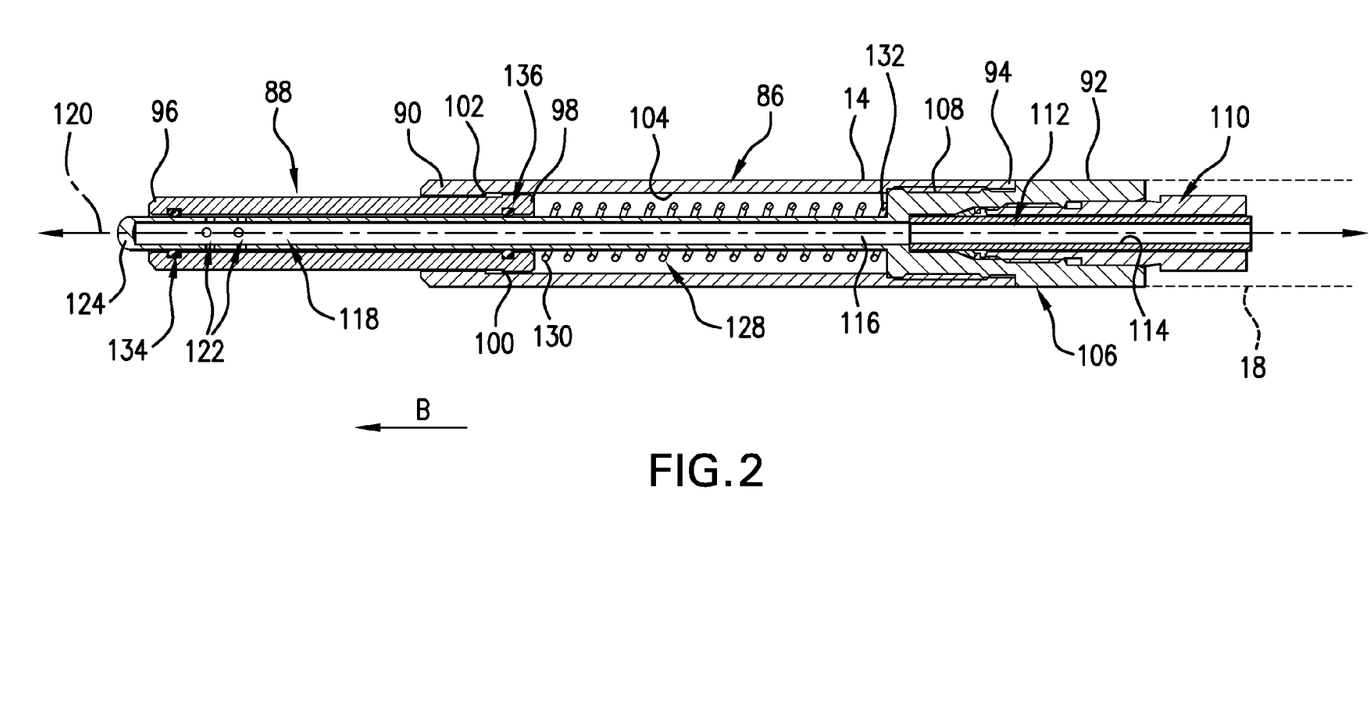
FIG. 2 shows a cross-sectional view of an exemplary embodiment of a male connector for a downhole wet connection system.
Figure 3:
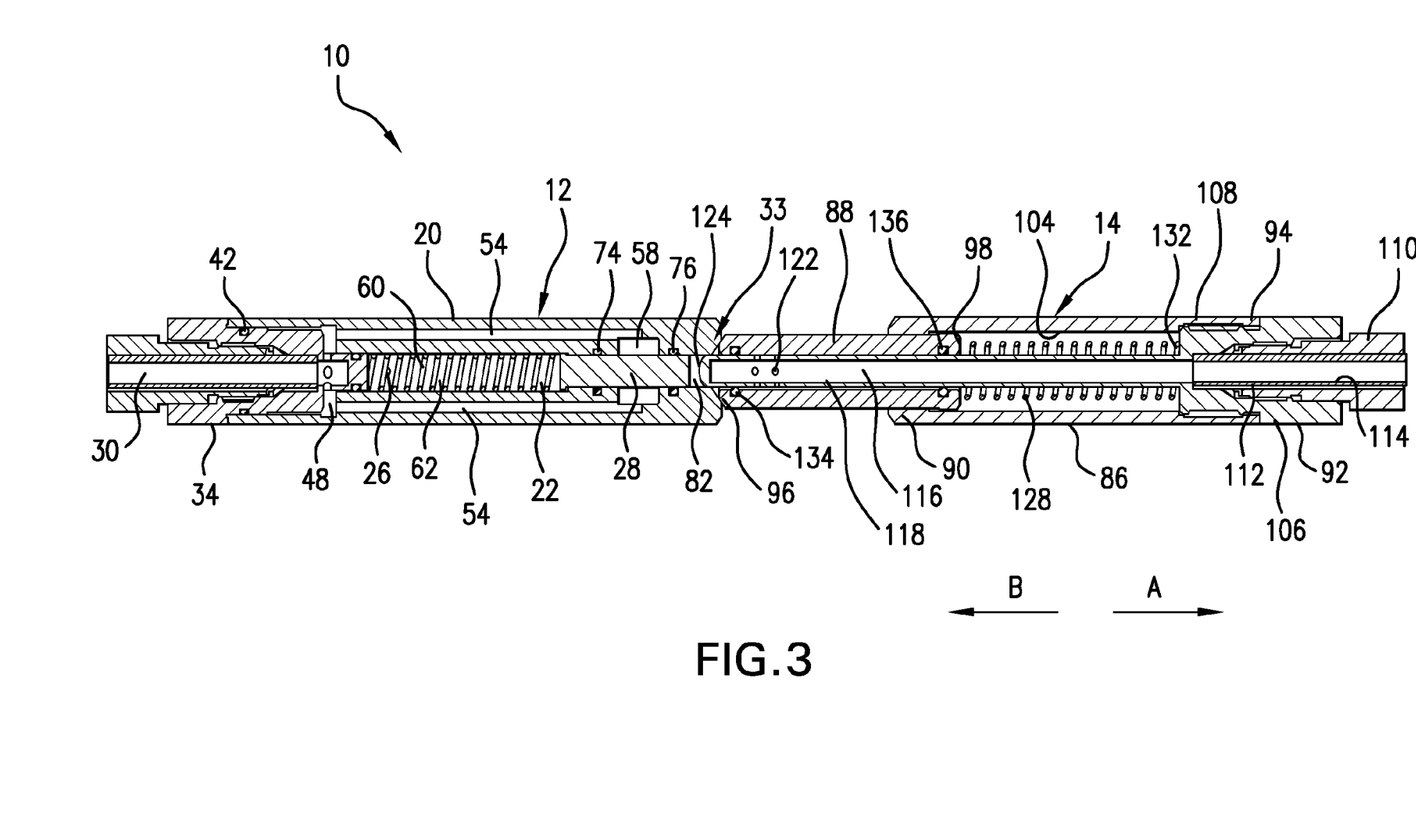
FIG. 3 shows a cross-sectional view of the female connector of FIG. 1 in contact with the male connector of FIG. 2.
Figure 4:
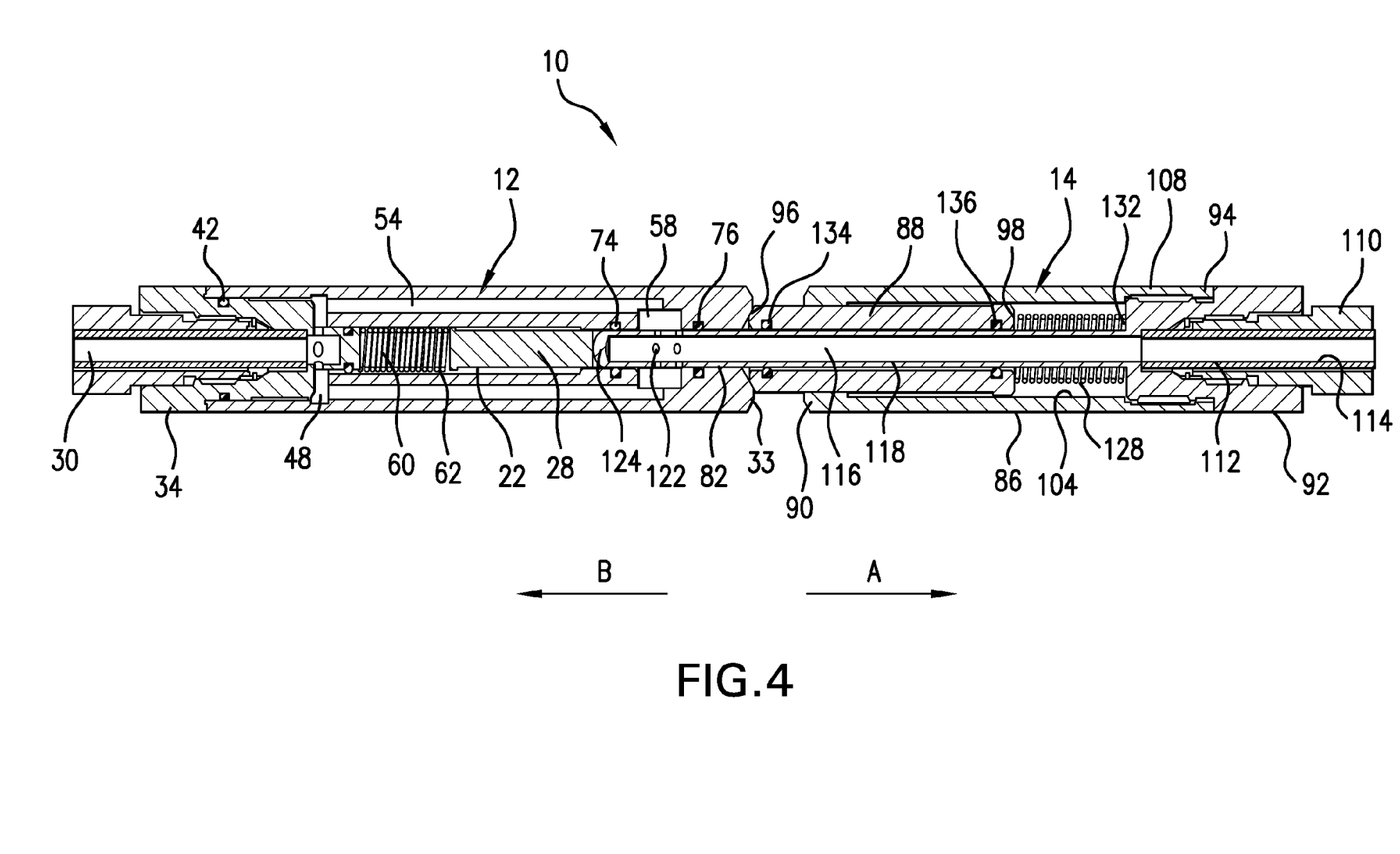
FIG. 4 shows a cross-sectional view of the female connector of FIG. 1 fully connected with the male connector of FIG. 2.

With reference to FIGS. 1-4, an exemplary embodiment of a wet connection system 10 is shown to include a female connector 12 (shown in FIGS. 1, 3, and 4) and a male connector 14 (shown in FIGS. 2, 3, and 4). The female connector 12 is connectable to a first tool component 16, such as a carrier tool, control string, or upper completion, while the male connector 14 is connectable to a second tool component 18, such as a carrier tool, control string, or lower completion. Typically the female connector 12 will be positioned uphole of the male connector 14 within a borehole, because the male connector 14 is less likely to suffer from a collection of debris therein, however the connectors 12, 14 are functional in a reversed orientation. The female connector 12, shown on its own in FIG. 1, will now be described. The female connector 12 includes a female connector housing 20 having a longitudinal bore 22 extending along a longitudinal axis 24 of the female connector 12. At least one bleed port 26 penetrates the female connector housing 20 and fluidically connects the longitudinal bore 22 to an exterior of the housing 20, such as the environment of the borehole during use of the wet connection system 10. The bleed port 26 functions as a pressure balancing aperture by allowing equal pressure to be placed on both sides of a movable plug 28, which will be described in more detail further below.

A control line 30 is supported at a first end 32 of the female connector housing 20 by a control line supporting structure 34, such as a male jamnut connector 36 that is inserted into a female connector nut 38. The control line supporting structure 34, in particular the female connector nut 38, is sealed to a control line supporting structure receiving portion 40 of the housing 20, adjacent the first end 32 thereof, with seal 42. In the illustrated embodiment, the control line supporting structure receiving portion 40 of the housing 20 receives the female connector nut 38 partially therein, with a shoulder 44 of the female connector nut 38 abutting with the first end 32 of the housing 20, and the female connector nut 38 partially receives the jamnut connector 36 therein. The control line 30 is supported within a longitudinal bore of the jamnut connector 36 and within a longitudinal bore of the female connector nut 38.

The control line 30 includes a longitudinal bore 46 which is in fluid communication with fluid path hub 48 in the housing 20 of the female connector 12. The fluid path hub 48 includes one or more radially extending fluid paths 50 that connect, respectively, to first ends 52 of one or more longitudinally extending fluid paths 54 within the housing 20. In the illustrated embodiment, the longitudinally extending fluid paths 54 are substantially parallel to the longitudinal axis 24 and do not include any moving parts therein, in contrast to poppet valves that typically obstruct fluid pathways. Second ends 56 of the longitudinally extending fluid paths 54 fluidically connect to a fluidic mating area 58. Fluidic mating area 58 may include an outer diameter that is larger than an outer diameter of the longitudinal bore 22, or may include separate radially extending paths that connect the longitudinal bore 22 to the longitudinally extending fluid paths 54.

A spring 60 is positioned within a spring area 62 of the longitudinal bore 22 of the housing 20. A first end 64 of the spring 60 abuts against a block 66 that is sealed by seal 68 within the housing 20. The seal 68, such as an O-ring, is supported within a groove or indent in the block 66. The block 66, which may be seated within the longitudinal bore 22, is axially interposed between the fluid path hub 48 and the spring area 62, so as to seal the longitudinal bore 22 from the fluid path hub 48. A second end 70 of the spring 60 abuts against a first end 72 of the movable plug 28. The movable plug 28 is supported within the longitudinal bore 22 by seals 74, 76 that flank the fluidic mating area 58. The seals 74, 76, such as O-rings, are radial seals that have a substantially same diameter as each other and are supported within indents in the housing 20, where the indents are radially expanded sections from the longitudinal bore 22. Because the seals 74, 76 are supported within indents in the housing 20, they do not move with the movable plug 28, and are therefore substantially axially immovable. The first end 72 of the movable plug 28 may include a shoulder 78 that abuts a stop 80, a reduced diameter section of the longitudinal bore 22, to prevent the movable plug 28 from being pushed further out the housing 20 by the spring 60. The movable plug 28 is biased by the spring 60 in direction A to block the fluidic mating area 58 with the movable plug 28, thus preventing fluid communication between the paths 54 and an exterior of the female connector 12 in a disconnected condition of the female connector 12, as depicted in FIG. 1. The longitudinal bore 22 of the housing 20 further includes a male connector receiving area 82, that may additionally included a flared portion 84 to guide and receive operative portions of the male connector 14 therein, as will be further described below.

The male connector 14, shown on its own in FIG. 2, includes a male connector housing 86 that receives a movable sleeve 88 within a first end 90 and a control line supporting structure 92 within a second end 94 of housing 86. A first end 96 of the male connector sleeve 88 is exterior of the housing 86 and a second end 98 of the male connector sleeve 88 is disposed internally within the housing 86. A shoulder 100 of the male connector sleeve 88, such as an enlarged outer diameter portion of the sleeve 88, abuts with a stop 102, such as a reduced diameter portion of longitudinal bore 104 adjacent the first end 90 of the male connector housing 86, to prevent the male connector sleeve 88 from disengaging with the housing 86. The control line supporting structure 92 may include a male connector nut 106 received within a control line supporting structure receiving portion 108 of the male connector housing 86 and a jamnut connector 110 received within the male connector nut 106. A control line 112 is supported within a longitudinal bore of the jamnut connector 110 and within a longitudinal bore of the connector nut 106. The control line supporting structure 92 may be substantially the same as the control line supporting structure 34 attached to the female connector housing 20.

The control line 112 includes a longitudinal bore 114 which is in fluid communication with a longitudinal bore 116 of a male connector probe 118 that extends along a longitudinal axis 120 of the male connector 14. The male connector probe 118 extends beyond the first end 90 of the male connector housing 86. The male connector probe 118 includes radially directed ports 122 adjacent a first end 124 of the male connector probe 118 that connects the longitudinal bore 116 of the male connector probe 118 to an exterior of the male connector probe 118. The longitudinal bore 116, which forms a pathway from the control line 112 to the ports 122 need not contain any moving parts therein. The ports 122 are located exteriorly of the housing 86. The first end 124 of the probe 118 may be positioned exteriorly of the sleeve 88. A second end 126 of the probe 118 fluidically connects the longitudinal bore 116 of the probe 118 with the longitudinal bore 114 of the control line 112. A spring 128 surrounds the male connector probe 118 within the male connector housing 86. A first end 130 of the spring 128 abuts the second end 98 of the movable sleeve 88 and a second end 132 of the spring 128 abuts the connector nut 106. The spring 128 biases the movable sleeve 88 in the direction B. The movable sleeve 88 is sealed to the male connector probe 118 via radial seals 134, 136, such as O-rings, which are axially secured relative to the sleeve 88 within indents of the sleeve 88. The ports 122 are axially disposed between the seals 134, 136, in the biased condition of the movable sleeve 88, such that fluid communication between an exterior of the male connector probe 118 and the longitudinal bore 116 of the male connector probe 118 is prevented in the disconnected condition of the male connector 14.

FIG. 3 depicts initial contact of the male connector 14 with the female connector 12. The first end 96 of the movable sleeve 88 abuts with the second end 33 of the housing 20 while the first end 124 of the male connector probe 118 is guided within the longitudinal bore 22 of the housing 20 by the flared portion 84 of the male connector receiving area 82 of the bore 22. At the initial contact depicted in FIG. 3, the movable plug 28 still blocks the fluidic mating area 58 and the movable sleeve 88 still blocks the male connector ports 122. Further engagement between the female and male connectors 12, 14 is shown in FIG. 4, such as via an upper completion pushing the female connector 12 onto the male connector 14 attached to a lower completion. The second end 33 of the female connector housing 20 pushes the movable sleeve 88 into the male connector housing 86 in direction A against the bias of the spring 128, while the movable plug 28 is pushed by the male connector probe 118 in direction B against the bias of the spring 60. In the fully connected condition shown in FIG. 4, the ports 122 of the male connector probe 118 are positioned in the fluidic mating area 58 of the female connector housing 20 of the female connector 12. The probe 118 in the connected condition is sealed within the housing 20 by the seals 74, 76 that flank the fluidic mating area 58. In the connected condition, the longitudinal axis 24 of the female connector 12 aligns with the longitudinal axis 120 of the male connector 14 to form a common longitudinal axis of the wet connection system 10. Also in the connected condition, the control line 30 is in fluid communication with the control line 112. The hydraulic path from the control line 30 to the control line 112 is via the fluid path hub 48, radially extending paths 50, longitudinally extending paths 54, fluid mating area 58, male connector ports 122, and longitudinal bore 116 of the male connector probe 118.

In the embodiment shown in FIGS. 1-4, wellbore pressure is ported to the longitudinal bore 22 of the female connector 12 via the bleed port 26 allowing the connection system 10 to maintain pressure balance and eliminate a de-mating force created from applied control line pressure. De-mating forces are only generated by hydrostatic differential pressure vs. the internal control line hydrostatic pressure and sleeve/plug springs, which does not occur in the wet connection system 10.

Figure 5:
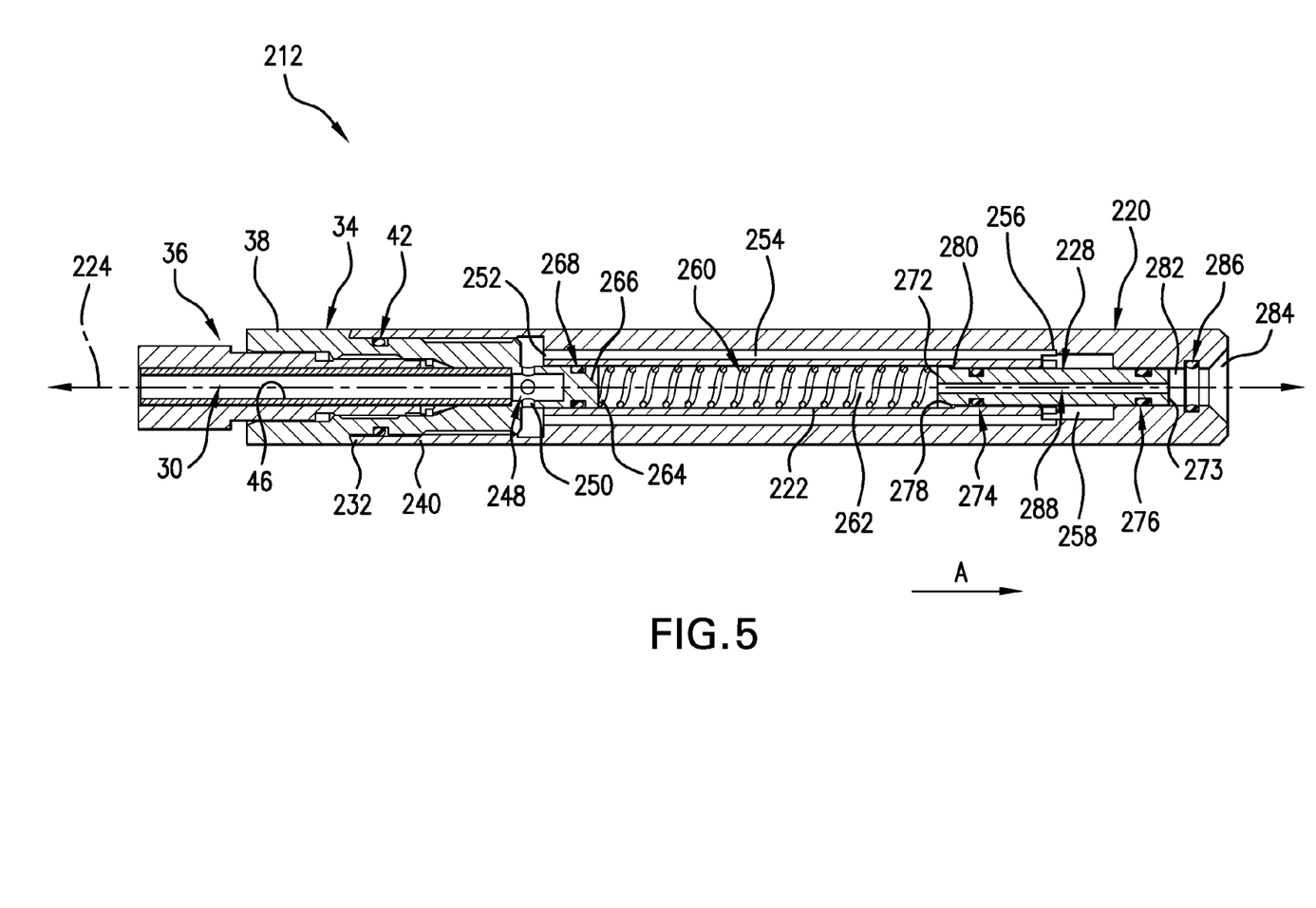
FIG. 5 shows a cross-sectional view of another exemplary embodiment of a female connector for a downhole wet connection system.
Figure 6:
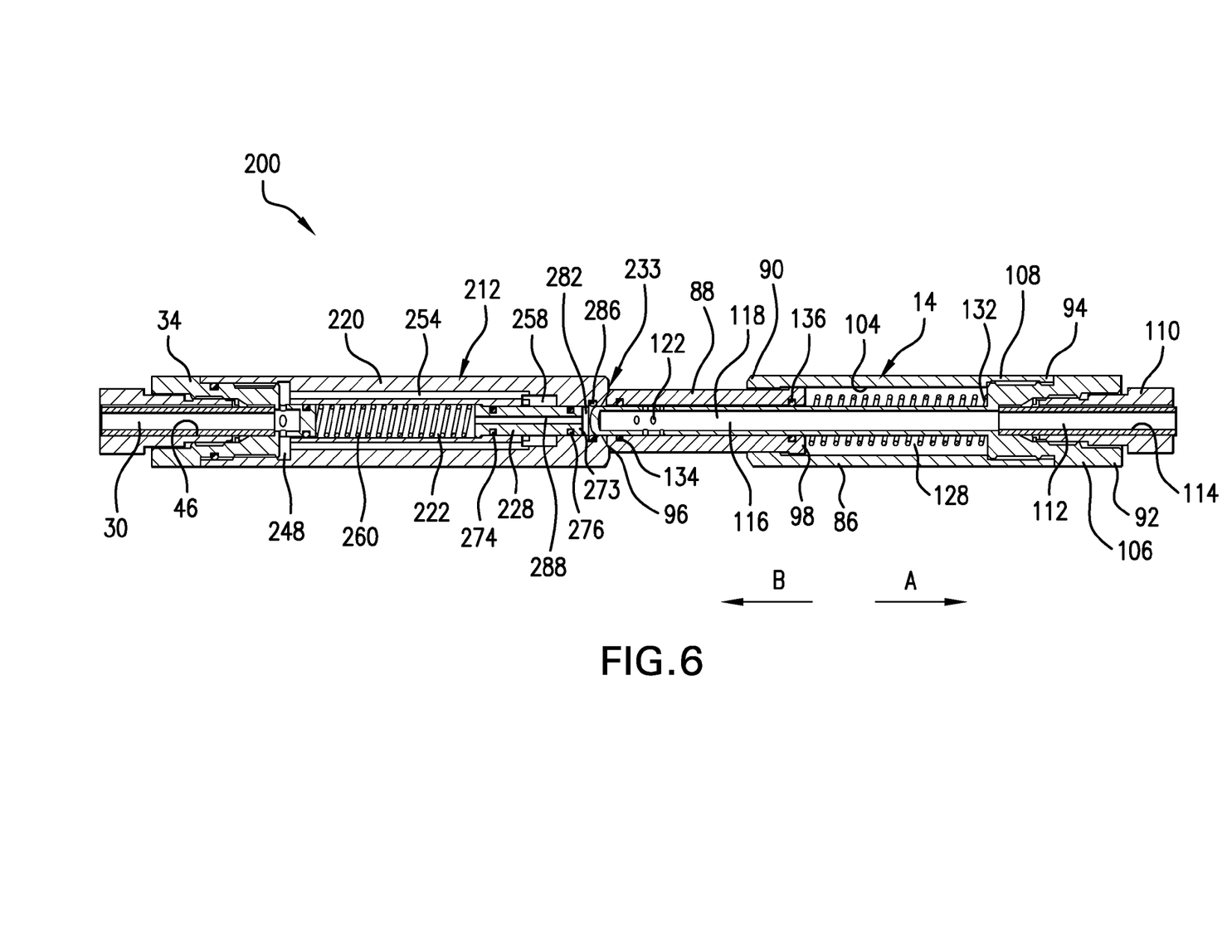
FIG. 6 shows a cross-sectional view of the female connector of FIG. 5 in contact with the male connector of FIG. 2; and, FIG. 7 shows a cross-sectional view of the female connector of FIG. 5 fully connected with the male connector of FIG. 2.
Figure 7:
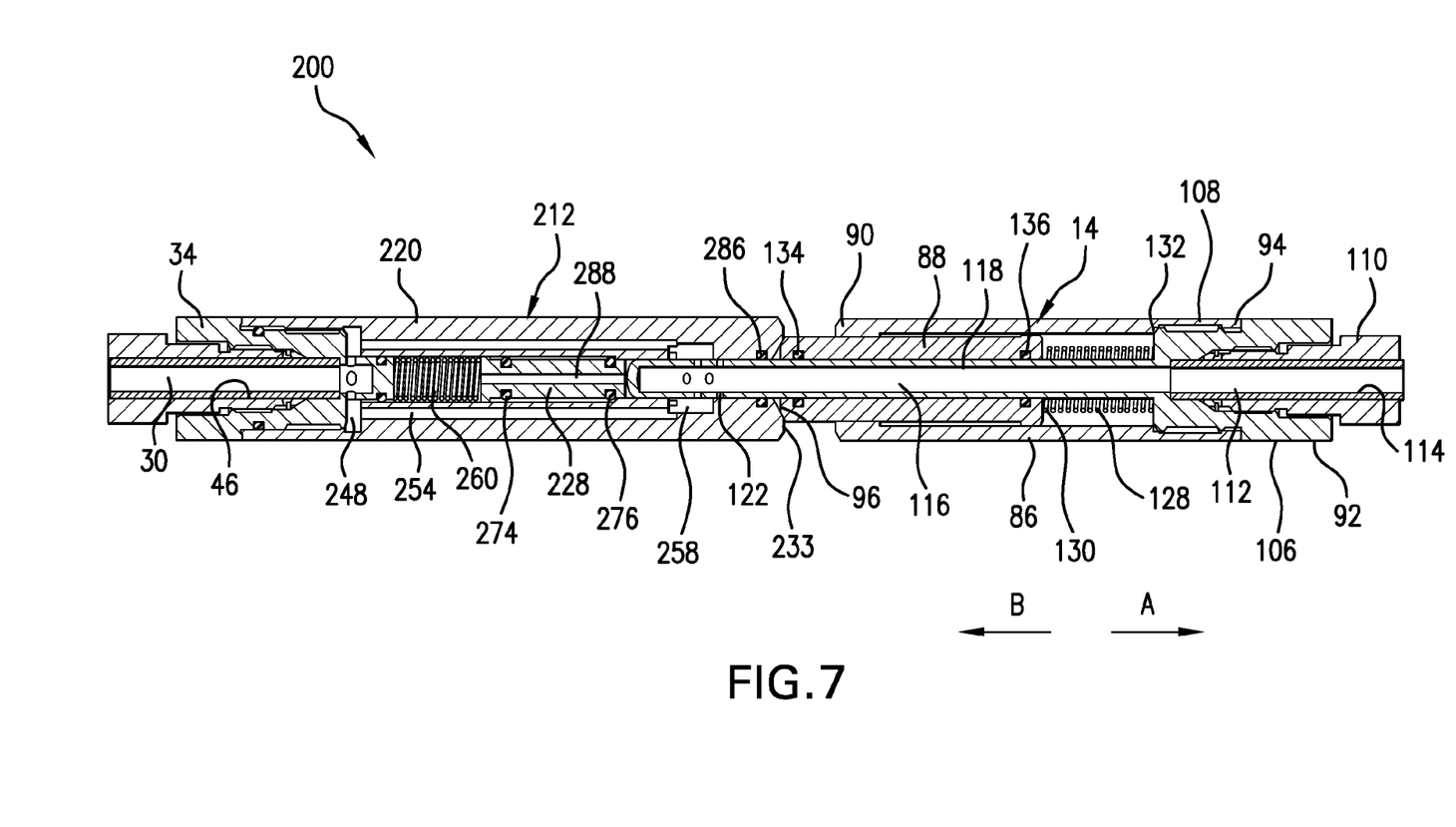

With reference to FIGS. 5-7, another exemplary embodiment of a wet connection system 200 is shown to include a female connector 212 and a male connector 14. The male connector 14 may be the same or substantially the same as the male connector 14 shown in FIG. 2 of the wet connection system 10 and therefore reference may be made to FIGS. 2-4 for a description of the male connector 14 of the wet connection system 200. The female connector 212, shown on its own in FIG. 5, will now be described. The female connector 212 includes a female connector housing 220 having a longitudinal bore 222 extending along a longitudinal axis 224 of the female connector 212. A control line 30 is supported adjacent a first end 232 of the female connector 212 by a control line supporting structure 34, as in the wet connection system 10. That is, the male jamnut connector 36 is inserted into the female connector nut 38 and received in a control line supporting structure receiving portion 240, as in the female connector 14 of the wet connection system 10.

The control line 30 includes longitudinal bore 46 which is in fluid communication with fluid path hub 248 and one or more radially extending fluid paths 250 that connect to first ends 252 of one or more longitudinally extending fluid paths 254 within the female connector housing 220. Second ends 256 of the longitudinally extending fluid paths 254 fluidically connect to the fluidic mating area 258. Fluidic mating area 258 may include an outer diameter that is larger than an outer diameter of the longitudinal bore 222, or may include separate radially extending paths that connect the longitudinal bore 222 to the longitudinally extending paths 254. A spring 260, or other biasing device, is positioned within a biasing area or spring area 262 of the longitudinal bore 222 of the female connector housing 220. A first end 264 of the spring 260 abuts against a block 266 that is sealed by seal 268 within the female connector housing 220. The seal 268, such as an O-ring, is supported within a groove in the block 266. The block 266 is axially interposed between the fluid path hub 248 and the spring area 262 of the longitudinal bore 222. A second end 270 of the spring 260 abuts against a first end 272 of a movable plug 228. The movable plug 228 is supported within the longitudinal bore 222 by seals 274, 276 that flank the fluidic mating area 258. The seals 274, 276, such as O-rings, have a same diameter as each other and are supported within indents in the movable plug 228 to move with the movable plug 228 during connection. The first end 272 of the movable plug 228 may include a shoulder 278 that abuts a stop 280 within the longitudinal bore 222 to prevent the movable plug 228 from being pushed further out the female connector housing 220 by the spring 260. The movable plug 228 is biased by the spring 260 in direction A to block the fluidic mating area 258 with the movable plug 228, thus preventing fluid communication between the longitudinal paths 254 and an exterior of the female connector housing 220 in a disconnected condition of the female connector 212. The longitudinal bore 222 of the housing 220 further includes a male connector receiving area 282 having a flared portion 284 to guide and receive the male connector 14 therein.

Between a second end 273 of the movable plug 228 and the second end 233 of the female connector housing 220, a seal 286, such as an O-ring, is provided in an indent in the male connector receiving area 282 of the longitudinal bore 222. Also different from the movable plug 28 of the female connector 12, the movable plug 228 of the female connector 212 includes a longitudinal piston port 288 extending from the first end 272 to the second end 273 of the movable plug 228, providing fluid communication between the spring area 262 of the longitudinal bore 222 and an exterior of the female connector 212 in the disconnected condition of the female connector 212. Also unlike the female connector 12, the female connector housing 220 does not include the bleed port 26.

The wet connection system 200 operates substantially as does the wet connection system 10, however the male connector probe 118, upon entry within the longitudinal bore 222 of the female connector housing 220, is sealed to the female connector 212 by the seal 286 instead of the seals 74, 76, as shown in FIG. 7. It should be noted that seal 286 and seals 134, 136 may have the same inner diameter to seal the male connector probe 118 therein with substantially constant radially directed sealing forces. By blocking the piston port 288 with the probe 118, well bore pressure (pressure from the borehole in which the wet connection system 200 is employed) is eliminated within the system 200 after mating. Applied control line pressure will generate a de-mating force but hydrostatic forces are eliminated. That is, in the wet connection system 200, the bleed port 26 of the wet connection system 10 is eliminated, the seals 274, 276 are placed on the movable plug 228, and the piston port 288 in the movable plug 228 allows fluid bypass in a disconnected condition and while initially mating the male and female connectors 14, 212. However, in the connection condition as shown in FIG. 7, hydrostatic pressure is eliminated from the connectors 14, 212. De-mating forces are generated by the sleeve/plug springs 260, 128 and the applied control line force. Both connection systems 10, 200 will have benefits depending on the purpose of the control line connection required for a particular downhole operation.

An exemplary operating procedure of the wet connection systems 10, 200 will involve assembling a first connector (either male 14 or female 12, 212), attaching it to control line 30, 112, and installing it in a carrier tool that will subsequently be placed at the top of a lower completion or section of tool string, e.g. tool component 18, that is intended to connect or disconnect at a future point. A second connector (female 12, 212 or male 14) is assembled, attached to a control line 112, 30, and installed in a carrier tool that will subsequently be placed at the bottom of a completion or section of tool string, e.g. tool component 16, that is intended to connect or disconnect at a future point. While each connector is disconnected, the sleeve 88 in the male connector 14 covers ports 122 and the movable plug 28, 228 in the female connector 12, 212 covers the fluidic mating area 58, 258 separating the exterior of each connector 14, 12, 212 from the internal control line volume, respectively. The sleeve/plug is sealed with an equal pressure area on both sides so that both control line pressure and ambient (hydrostatic) pressure impart equal forces in both axial directions, directions A, B. This prevents the internal or external pressure from moving the sleeve/plug. The sleeve/plug is biased with a spring 128, 60, 260 against a shoulder that prevents an unwanted shift from occurring. The tool component 16 and second connector with control line attached thereto is then run into the borehole to connect with the first connector. When male and female connectors 14, 12, 212 are mated the sleeve/plug is moved by the other connector exposing the internal control line pressure of one connector to the internal control line pressure of the other connector. Control line pressure can then be applied to downhole tools or other chemicals can then be injected to the formation. When de-mating is required, the biasing spring 128, 60, 260 returns the sleeve/plug to its starting position.

The use of the pressure balanced sleeve and plug in the wet connection systems 10, 200 described herein is an improvement over downhole hydraulic connectors that rely on a spring reinforced poppet to resist the encroachment of wellbore fluids into the control line, as such connectors having spring reinforced poppets are limited in pressure differential by the force of the spring holding the poppet in place. Once the hydrostatic pressure overcomes the spring of the spring reinforced poppets, wellbore fluid will leak into the control line. The wet connect systems 10, 200 are further an improvement over downhole hydraulic connectors that supply virtually no wellbore fluid protection at all and simply allow the fluid access to the control line, which may not be desirable depending on the wellbore fluid and the internal make up of the tools the control line is attached to. The wet connection system 10 also advantageously does not create additional de-mating forces with applied control line pressure. This allows the operator to apply control line pressure without concern that the pressure is causing the male and female connectors 14, 12 to de-mate.

The wet connection systems 10, 200 advantageously provide the ability to run the connectors 12, 212, 14 downhole without concern of wellbore fluid encroachment into the hydraulic control lines 30, 112. Radial seals are used in the wet connection systems 10, 200 that are balanced in the axial direction no matter where a higher pressure is located. This is especially true in the case of running multiple stage completions. Prior hydraulic connectors require either allowing wellbore fluid encroachment or running the lower string while mated to an upper tool string with control line all the way to surface in order to maintain a positive pressure balance on the control line. Not having to run control line along an upper run-in string saves hours of rig time required to install control line protection that would subsequently have to be removed on the way back out of a borehole.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A wet connection system comprising:
a first connector configured to connect to a first control line, the first connector including at least one first pathway arranged to fluidly communicate with the first control line, and a biased movable plug movable within the first connector; and,
a second connector configured to connect to a second control line, the second connector comprising a second pathway in fluid communication with the second control line and a biased sleeve movable within the second connector;
wherein the first and second connectors are each pressure balanced to prevent internal control line pressure and external borehole pressures from moving the plug and sleeve from their biased positions blocking the respective first and second pathways in the disconnected condition of the wet connection system, and mating of the first connector with the second connector moves the movable plug and the sleeve against their bias to fluidically couple the first and second pathways in a connected condition of the wet connection system.

2. The wet connection system of claim 1, wherein the first connector includes a first connector housing having a first bore and the biased movable plug is movable within the first bore to block the first bore from the first pathway in the disconnected condition of the wet connection system; and the second connector includes a probe housing the second pathway, the probe including at least one connector port communicating with the second pathway, and the biased sleeve surrounds the probe and covers the at least one connector port in the disconnected condition of the wet connection system.

3. The wet connection system of claim 2 wherein the second connector includes first and second radial seals within indents in the sleeve, the first seal disposed on a first side of the at least one connector port and the second seal disposed on a second side of the at least one connector port in the disconnected condition of the wet connection system.

4. The wet connection system of claim 2 wherein the first connector further comprises a pressure balancing aperture balancing pressure on opposing sides of the movable plug in the disconnected condition.

5. The wet connection system of claim 4 wherein the pressure balancing aperture includes a bleed port in the first connector housing penetrating a biasing area of the first bore on a first side of the movable plug, wherein the bleed port additionally prevents a de-mating force from applied control line pressure in the connected condition.

6. The wet connection system of claim 1 wherein the first and second pathways are free of movable obstructions.

7. A downhole system comprising:
the wet connection system of claim 1;
a first downhole tool component;
the first control line extending from the first downhole tool component;
a first control line supporting structure supporting the first control line and securing it to the first connector;
a second downhole tool component;
the second control line extending from the second downhole tool component; and
a second control line supporting structure supporting the second control line and securing it to the second connector.

8. A wet connection system including at least one of a first connector and a second connector,
the first connector configured to connect to a first control line, the first connector including:
a first connector housing having a first bore, at least one first pathway separate from the first bore, and a fluidic mating area, the at least one first pathway configured to fluidly communicate the fluidic mating area with the first control line, the fluidic mating area interposed between a biasing area of the first bore and a second connector receiving area of the first bore;
a biased movable plug movable within the first bore, the movable plug having a first end facing the biasing area of the first bore and a second end facing the second connector receiving area of the first bore, the movable plug biased to block the fluidic mating area to prevent fluidic communication between the first bore and the at least one first pathway in a disconnected condition of the wet connection system, the movable plug movable outside of the fluidic mating area in a connected condition of the wet connection system; and
a pressure balancing aperture balancing pressure between the biasing area and the second connector receiving area; and,
the second connector configured to connect to a second control line, the second connector including:
a probe housing a second pathway in fluid communication with the second control line, the probe including at least one radially directed connector port communicating with the second pathway;
a biased movable sleeve configured to at least partially surround the probe and cover the at least one connector port in the disconnected condition and reveal the at least one connector port in the connected condition;
first and second radial seals between the sleeve and probe, the first seal disposed on a first side of the at least one connector port and the second seal disposed on a second side of the at least one connector port in the disconnected condition of the wet connection system.

9. The wet connection system of claim 8 including the first connector, wherein the pressure balancing aperture is a bleed port in the first connector housing penetrating the biasing area of the first bore.

10. The wet connection system of claim 8 including the first connector, wherein the pressure balancing aperture is a longitudinally extending piston port in the movable plug, the piston port extending from the first end to the second end of the movable plug.

11. The wet connection system of claim 8 including the first connector, wherein the fluidic mating area is sealed from the second connector receiving area in a disconnected condition of the wet connection system.

12. The wet connection system of claim 11 wherein the first connector housing includes first and second indents flanking the fluidic mating area and extending radially outwardly of the first bore, and first and second seals received within the first and second indents.

13. The wet connection system of claim 12 wherein the movable plug includes first and second indents receiving first and second seals therein, wherein the first and second seals flank the fluidic mating area in the disconnected condition.

14. The wet connection system of claim 13 wherein the first connector housing includes a third indent extending radially outwardly of the second connector receiving area of the first bore, and a third seal received within the third indent.

15. The wet connection system of claim 8 including the first connector, wherein the first connector housing further includes a fluid path hub having at least one radially extending path in communication with the at least one first pathway, respectively, the fluid path hub configured to provide fluid communication between the at least one first pathway and the first control line.

16. The wet connection system of claim 8, including the second connector, wherein the second connector further includes a second connector housing supporting the sleeve and probe therein, the second connector housing including a shoulder engageable with a stop on the sleeve in a biased condition of the sleeve.

17. The wet connection system of claim 16, wherein the second connector further include a spring within the housing and at least partially surrounding the probe, the spring biasing the sleeve away from a second control line.

18. The wet connection system of claim 8, including the second connector, wherein the second pathway extends along a longitudinal axis of the second connector.

19. The wet connection system of claim 8 including both the second connector and the first connector, wherein mating of the second connector with the first connector moves the movable plug against its bias to unblock the fluidic mating area and fluidically couple the first and second pathways.

20. The wet connection system of claim 19, wherein the at least one port in the probe of the second connector is arrangeable within the fluidic mating area in the connected condition.

21. The wet connection system of claim 19, further comprising the first control line, the second control line, a first control line supporting structure securing the first control line to the first connector, and a second control line supporting structure securing the second control line to the second connector.

22. A method of pressure balancing a hydraulic wet connection system in a downhole environment, the method comprising:

providing a first connector with a pressure balancing aperture balancing pressure between opposing sides of a biased movable plug, the plug biased to block, in a disconnected condition, a first pathway in the first connector, the first connector configured to prevent internal control line pressure and external borehole pressures from moving the plug from its biased position in a disconnected condition of the wet connection system;

providing a second connector with first and second seals between a probe and a biased movable sleeve, the sleeve biased to block, in a disconnected condition, ports in the probe that connect to a second pathway, the second connector configured to prevent internal control line pressure and external borehole pressures from moving the sleeve from its biased position in a disconnected condition of the wet connection system;

selecting one of the first connector and the second connector as a downhole connector, and the other of the first connector and the second connector as an uphole connector;

assembling the downhole connector to a first control line;

installing the downhole connector to an uphole end of a downhole tool component;

employing the downhole tool component in a borehole;

assembling the uphole connector to a second control line;

installing the uphole connector to a downhole end of an uphole tool component;

running the uphole tool component into the borehole; and, connecting the uphole connector to the downhole connector;

wherein connecting the uphole connector to the downhole connector moves the movable plug and the sleeve against their bias to fluidically couple the first and second pathways in a connected condition of the wet connection system.

23. The method of claim 22, further comprising preventing a de-mating force in a connected condition of the wet connection system by providing a bleed port penetrating a first connector housing of the first connector on a biasing side of the movable plug as the pressure balancing aperture in the first connector.

* * * * *